(12) United States Patent
Huang

(10) Patent No.: US 7,280,374 B1
(45) Date of Patent: Oct. 9, 2007

(54) SINGLE-STAGE POWER FACTOR CORRECTION CIRCUIT

(76) Inventor: Ming-Ho Huang, No. 25, WU-Gong 6th Rd., Wu-Ku Industrial Park, Taipei Hsien (TW)

(*) Notice: Subject to any disclaimer, the term of this patent is extended or adjusted under 35 U.S.C. 154(b) by 0 days.

(21) Appl. No.: 11/493,879

(22) Filed: Jul. 26, 2006

(30) Foreign Application Priority Data

May 9, 2006 (TW) .............................. 95207895 U

(51) Int. Cl.
*H02M 3/335* (2006.01)
(52) U.S. Cl. .................. 363/16; 363/21.12; 363/21.16; 363/37
(58) Field of Classification Search .................. 363/16, 363/19, 21.01, 21.08, 21.12, 21.15, 21.16, 363/21.17, 21.18, 37
See application file for complete search history.

(56) References Cited

U.S. PATENT DOCUMENTS

| 5,734,562 | A | * | 3/1998 | Redl | ............................ | 363/16 |
| 6,038,146 | A | * | 3/2000 | Luo et al. | ................ | 363/21.16 |
| 6,282,103 | B1 | * | 8/2001 | Naito et al. | .............. | 363/21.12 |

* cited by examiner

*Primary Examiner*—Jessica Han
(74) *Attorney, Agent, or Firm*—Law Offices of John Chupa & and Associates, P.C.

(57) ABSTRACT

The present invention discloses a single-stage power factor correction circuit that includes a first rectifier, a second rectifier, a full bridge rectifier, a capacitor, a seventh rectifier, a fly back transformer, and a switch. Unlike traditional single-stage power factor correction circuits, the present invention just needs to pass through two rectifiers at positive and negative half cycles, so as to reduce the conduction loss and lower the temperature of the power supply.

9 Claims, 3 Drawing Sheets

SINGLE-STAGE POWER FACTOR CORRECTION CIRCUIT

BACKGROUND OF THE INVENTION

1. Field of the Invention

The present invention relates to a single-stage power factor correction circuit, and more particularly to a single-stage power factor correction circuit that comes with a switch for facilitating positive and negative half cycles to provide a conducting path, so that the current just needs to pass through two rectifiers to lower the temperature of the power supply.

2. Description of the Related Art

In general, a single-stage power factor correction circuit is usually used in a high-performance power supply for improving power factor. In traditional single-stage power factor correction circuits, a loop is formed by passing current through three rectifiers at a positive half cycle or a negative half cycle by means of the ON and OFF of a metal oxide field effect transistor (MOFET).

However, the foregoing circuit has the following drawback. The current has to pass through three rectifiers to form a loop regardless at a positive half cycle or at a negative half cycle, and thus causing a higher conduction loss and increasing the temperature of the power supply.

In view of the foregoing shortcomings of the prior art, the present invention provides a single-stage power factor correction circuit to overcome the foregoing shortcomings.

SUMMARY OF THE INVENTION

It is a primary objective of the present invention to provide a single-stage power factor correction circuit that has a switch to provide a conducting path at positive and negative half cycles, so that the current just needs to pass through two rectifiers to lower the temperature of the power supply.

Another objective of the present invention is to provide a single-stage power factor correction circuit that can reduce the conduction loss and lower the temperature of the power supply.

To achieve the foregoing objectives, the single-stage power factor correction circuit of the present invention comprises: a first rectifier with an end coupled to a line input terminal; a second rectifier with an end coupled to a neutral input terminal; and a full bridge rectifier comprising a third rectifier, a fourth rectifier, a fifth rectifier and a sixth rectifier, wherein the positive electrode of the third rectifier is coupled to the line input terminal, and the negative electrode of the sixth rectifier is coupled to the neutral input terminal; a capacitor has an end coupled to the negative electrode of the fifth rectifier and another end coupled to the positive electrode of the sixth rectifier; a seventh rectifier with its positive electrode coupled to an end of the capacitor; a transformer comprises a first primary coil, a second primary coil and a first secondary coil, and an end of the first primary coil is coupled to the negative electrode of the seventh rectifier and another end is coupled to the second primary coil in series; and a switch is a three-terminal component with a first terminal coupled to another end of the second primary coil, a third terminal coupled to another end of the capacitor, and a second terminal coupled to a control signal, for receiving the control of the control signal to turn on or off a circuit.

The object and technical characteristics of the single-stage power factor correction circuit in accordance with the present invention will not be described in more detail hereinafter with reference to the accompanying drawings that show a preferred embodiment of the invention.

DETAILED DESCRIPTION OF THE PREFERRED EMBODIMENTS

Figure 1:
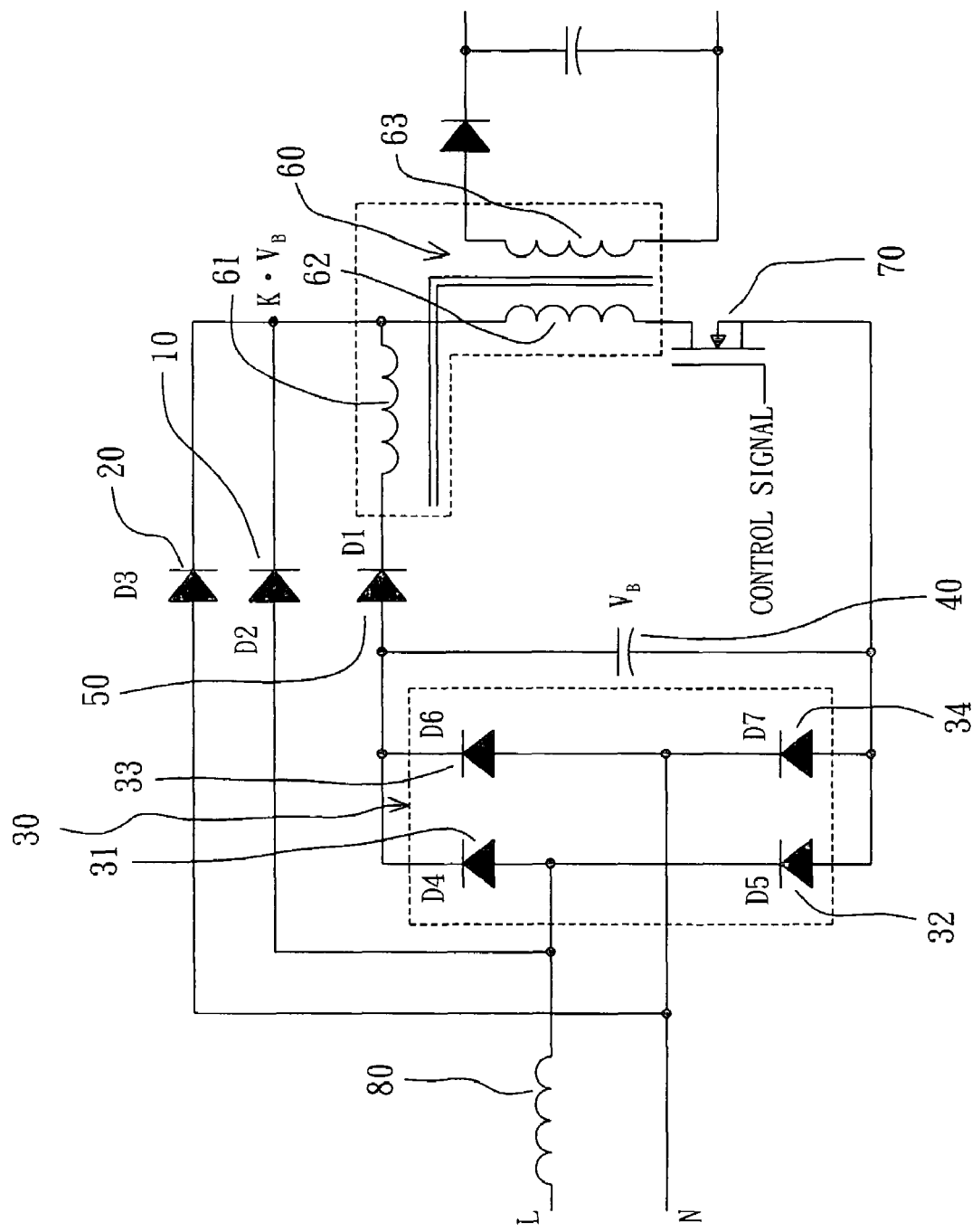
FIG. 1 is a schematic block diagram showing a single-stage power factor correction circuit according to a preferred embodiment of the present invention.

Referring to FIG. 1 for the schematic block diagram of a single-stage power factor correction circuit according to a preferred embodiment of the present invention, the single-stage power factor correction circuit comprises a first rectifier 10, a second rectifier 20, a full bridge rectifier 30, a capacitor 40, a seventh rectifier 50, a transformer 60 and a switch 70.

The first rectifier 10 including but not limited to a rectifier diode has an end coupled to a line input terminal (L) for providing a half wave rectification effect, but it relates to a prior art power supply and thus will not be described here.

The second rectifier 20 including but not limited to a rectifier diode has an end coupled to a neutral input terminal (N) for providing a half wave rectification effect, but it is related to a prior art power supply, and thus will not be described here.

The full bridge rectifier 30 has a third rectifier 31, a fourth rectifier 32, a fifth rectifier 33 and a sixth rectifier 34, wherein the positive electrode of the third rectifier 31 is coupled to the line input terminal and the negative electrode of the sixth rectifier 34 is coupled to the neutral input terminal, but it is related to a prior art power supply, and thus will not be described here.

An end of the capacitor 40 is coupled to the negative electrode of the fifth rectifier 33 and another end of the capacitor 40 is coupled to the positive electrode of the sixth rectifier 34, and the capacitor 40 has a voltage $V_B$.

The positive electrode of the seventh rectifier 50 is coupled to an end such as a positive electrode of the capacitor 40, and the seventh rectifier 50 can provide the half wave rectification function, but it is related to a prior art power supply, and thus will not be described here.

The transformer 60 including but not limited to a fly back transformer comprises a first primary coil 61, a second primary coil 62 and a first secondary coil 63, wherein an end of the first primary coil 61 is coupled to the negative electrode of the seventh rectifier 50 and another end of the first primary coil 61 is connected with the second primary coil 62 in series. Further, the first primary coil has N2 coils and the second primary coil has N1, such that the voltage at the position where the negative electrode of the first rectifier 10 is coupled to the first primary coil 61 has a voltage $KV_B$, and $K=N1/(N1+N2)$, and $V_B$ is the voltage between both ends of the capacitor 40.

The switch 70 is a three-terminal component which is any electric power switch including but not limited to a N-channel metal oxide field effect transistor (MOFET), a N-channel junction field effect transistor (JFET), a P-channel metal oxide field effect transistor (MOFET) or a P-channel junction field effect transistor (JFET), which are hereinafter referred to as a MOS switch 70, and the first terminal of the switch 70 is coupled to another end of the second primary coil 62, and the second terminal of the switch 70 is coupled to a control signal, and the third terminal of the switch 70 is coupled to another end of the capacitor 40, for receiving the control signal for turning on or on a circuit. The second terminal is a gate of the metal oxide field effect transistor (MOFET) 70 and the first terminal is a drain of the metal oxide field effect transistor (MOFET) 70, and the third terminal is a source of the metal oxide field effect transistor (MOFET) 70, wherein the control signal is outputted by an external power factor correction controller (not shown in the figure).

During the operation, both ends of the first rectifier 10 are reverse bias if the input voltage $V_i$ is less than the voltage $KV_B$, and thus the first rectifier 10 is situated at a cutoff state and the $V_B$ supplies electric power to the circuit. Both ends of the first rectifier 10 are forward bias, if the input voltage $V_i$ is greater than the voltage $KV_B$, and thus the first rectifier 10 is situated at a conducting state, and both ends of the third rectifier 31 are still reverse bias. By then, $V_i$ supplies electric power to the circuit.

Figure 2A:
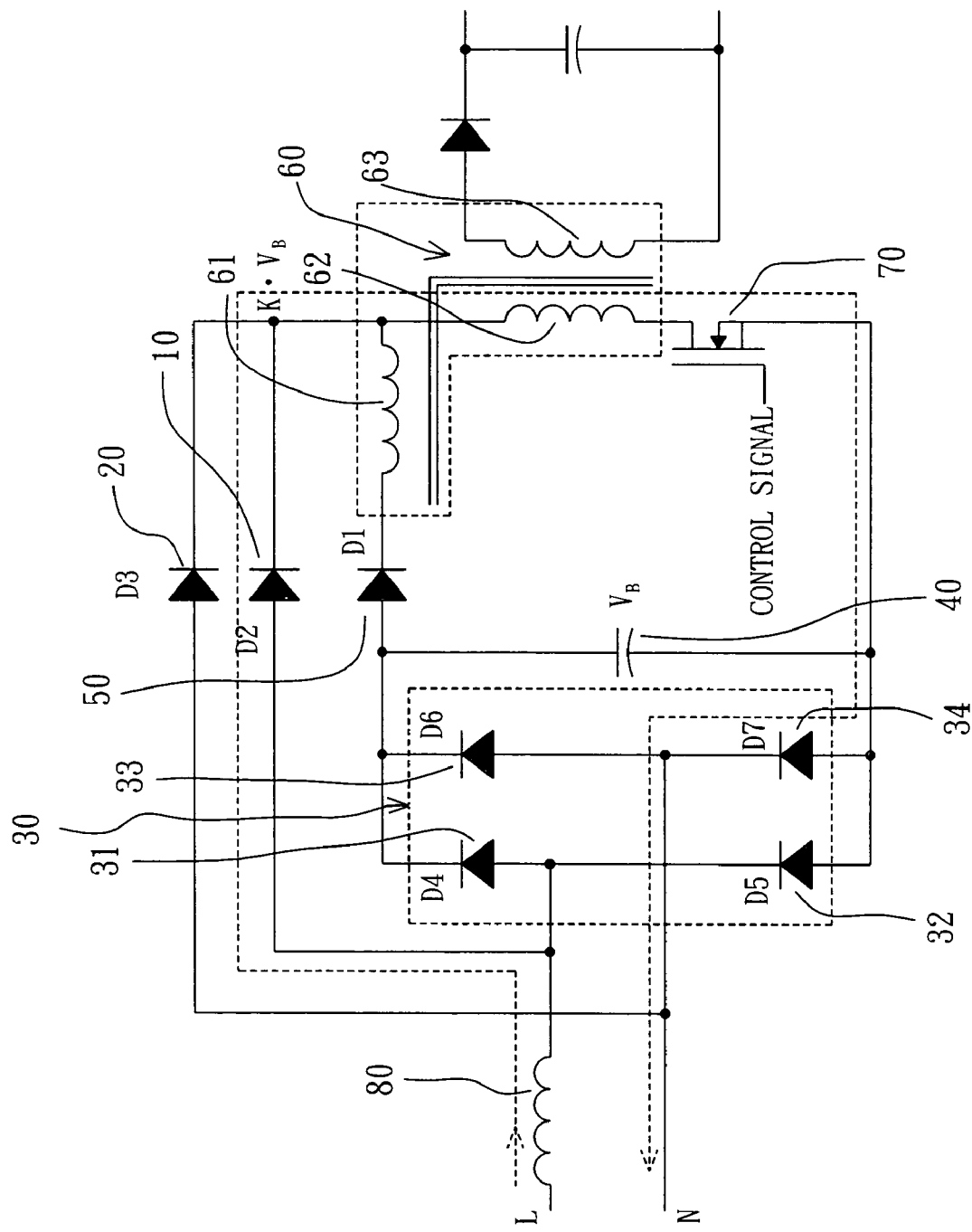
FIG. 2a is a schematic view of a current flow of a single-stage power factor correction circuit at a positive half cycle according to the present invention.

Referring to FIG. 2a for a schematic view of a current flow of a single-stage power factor correction circuit at a positive half cycle according to the present invention, the switch 70 is electrically conducted by the control of the control signal, if $V_i$ supplies electric power at a positive half cycle, so that the current flows from the line input terminal (L) through the first rectifier 10 and sixth rectifier 34 to the neutral input terminal (N) to form a current loop; and then the control signal turns off the switch 70, so that the current flows from the line input terminal (L) through the third rectifier 31 and the sixth rectifier 34 to the neutral input terminal (N) to form a current loop.

Figure 2B:
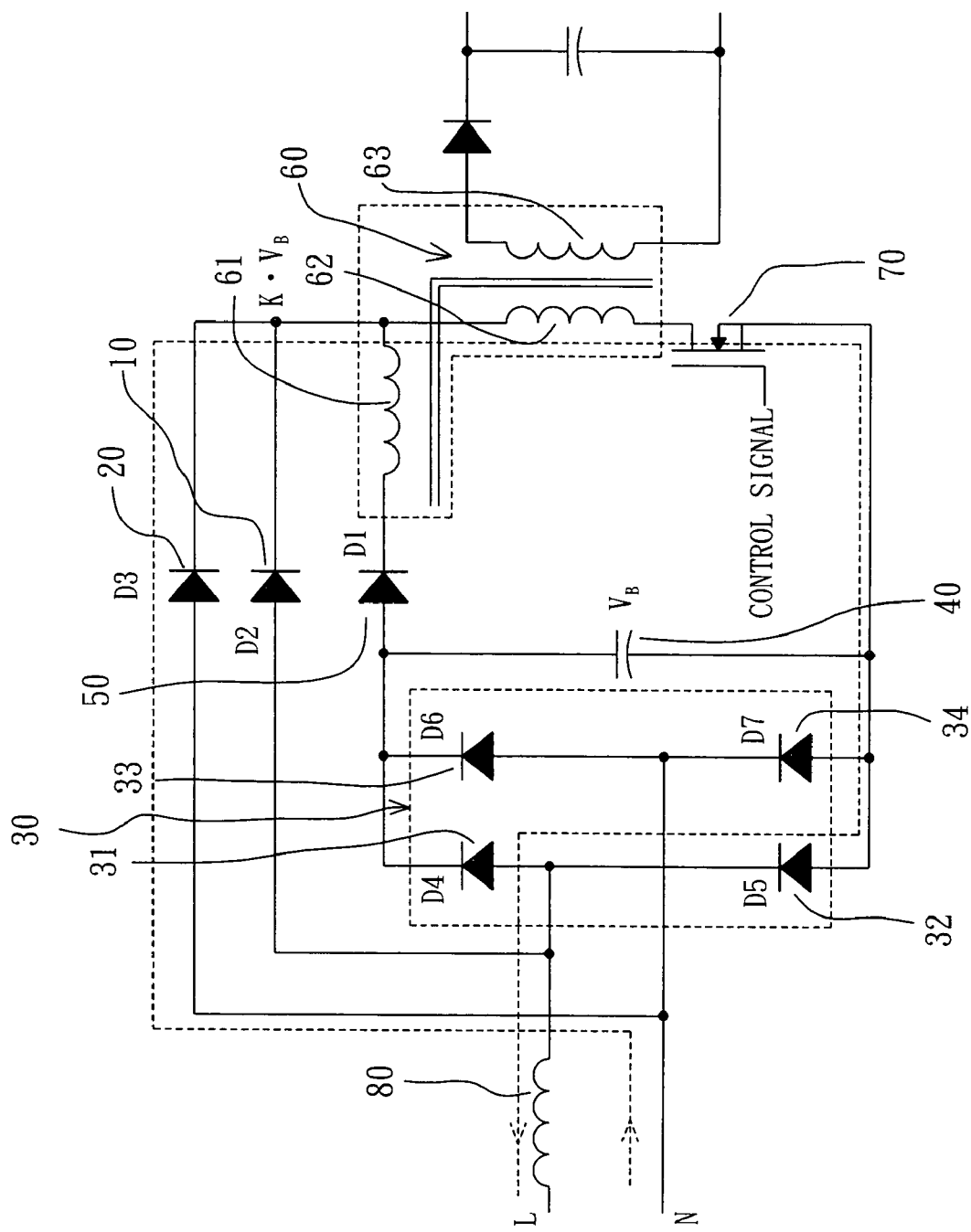
FIG. 2b is a schematic view of a current flow of a single-stage power factor correction circuit at a negative half cycle according to the present invention.

Referring to FIG. 2b for a schematic view of a current flow of a single-stage power factor correction circuit at a negative half cycle according to the present invention, the switch 70 is electrically conducted by the control of the control signal, if $V_i$ supplies electric power at a negative half cycle, so that the current flows from the neutral input terminal (N) through the second rectifier 20 and fourth rectifier 32 to the line input terminal (L) to form a current loop; and then the control signal turns off the switch 70, so that the current flows from the neutral input terminal (N) through the fifth rectifier 33 and the fourth rectifier 32 to the line input terminal (L) to form a current loop.

Therefore, the current just needs to pass through two rectifiers regardless of being situated at a positive half cycle or a negative half cycle in accordance with the single-stage power factor correction circuit of the invention, and thus the present invention can provide a lower conduction loss and reduce the temperature of the power supply. The single-stage power factor correction circuit of the invention definitely improves over the traditional single-stage power factor correction circuits.

In addition, the single-stage power factor correction circuit of the invention further includes an inductor 80 connected in series between the line input terminal (L) and the first rectifier 10 for storing electric energy and supplying electric power to the capacitor 40 at the same time, so as to slow down the change of the input current.

In summation of the description above, the object, technical characteristics and performance of the present invention are novel and improve over the prior art and thus is duly submitted for the patent application.

While the invention has been described by means of specific embodiments, numerous modifications and variations could be made thereto by those skilled in the art without departing from the scope and spirit of the invention set forth in the claims.

What is claimed is:

1. A single-stage power factor correction circuit, comprising:
   a first rectifier, with an end coupled to a line input terminal;
   a second rectifier, with an end coupled to a neutral input terminal;
   a full bridge rectifier, having a third rectifier, a fourth rectifier, a fifth rectifier and a sixth rectifier, having a positive electrode coupled to said line input terminal, and a negative electrode coupled to said neutral input terminal;
   a capacitor, with an end coupled to a negative electrode of said fifth rectifier and another end coupled to a positive electrode of said sixth rectifier;
   a seventh rectifier, having a positive electrode coupled to an end of said capacitor;
   a transformer, having a first primary coil, a second primary coil and a first secondary coil, and an end of said first primary coil being coupled to a negative electrode of said seventh rectifier and another end connected with said second primary coil in series; and
   a switch, being a three-terminal component and having a first terminal coupled another end of said second primary coil, a second terminal coupled to a control signal, and a third terminal coupled to another end of said capacitor, for receiving said control signal to turn on or off a circuit.

2. The single-stage power factor correction circuit of claim 1, wherein said switch is an electric power switch.

3. The single-stage power factor correction circuit of claim 2, wherein said electric power switch is an N-channel metal oxide field effect transistor, an N-channel junction field effect transistor, a P-channel metal oxide field effect transistor or a P-channel junction field effect transistor.

4. The single-stage power factor correction circuit of claim 3, wherein said first terminal is a drain of said metal oxide field effect transistor, and said second terminal is a gate of said metal oxide field effect transistor, and said third terminal is a source of said metal oxide field effect transistor.

5. The single-stage power factor correction circuit of claim 1, wherein said first rectifier, said second rectifier and said seventh rectifier are rectifier diodes.

6. The single-stage power factor correction circuit of claim 1, wherein said control signal is outputted by an external power factor correction controller, such that when said control signal is at a positive half cycle, said switch is conducted to allow current to pass through said first rectifier and said sixth rectifier, and then said switch is turned off to allow current to pass through said third rectifier and said sixth rectifier; and when said control signal is at a negative half cycle, said switch is conducted to allow current to pass through said second rectifier and said fourth rectifier, and then said switch is turned off to allow current to pass through said fifth rectifier and said fourth rectifier.

7. The single-stage power factor correction circuit of claim 1, wherein said first primary coil has N2 coils, and said second primary coil has N1 coils, such that a negative electrode of said first rectifier has a voltage $KV_B$, and $K=N1/(N1+N2)$, and $V_B$ is the voltage between both ends of said capacitor.

8. The single-stage power factor correction circuit of claim 1, further comprising an inductor connected in series between said line input terminal and said first rectifier for simultaneously supplying an electric power to said capacitor, so as to slow down the change of current.

9. The single-stage power factor correction circuit of claim 1, wherein said transformer is a fly back transformer.

* * * * *